United States Patent
Takada et al.

(10) Patent No.: US 7,561,768 B2
(45) Date of Patent: Jul. 14, 2009

(54) OPTICAL BRANCHING DEVICE

(75) Inventors: Akira Takada, Tokyo (JP); Shinya Ikoma, Tokyo (JP); Shigenori Nagano, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 11/956,695

(22) Filed: Dec. 14, 2007

(65) Prior Publication Data
US 2008/0219679 A1    Sep. 11, 2008

(30) Foreign Application Priority Data
Dec. 15, 2006  (JP) ............................. 2006-338014

(51) Int. Cl.
*G02B 6/28* (2006.01)
*G02B 6/32* (2006.01)
(52) U.S. Cl. .............................. 385/24; 385/27; 385/33
(58) Field of Classification Search ................ None
See application file for complete search history.

(56) References Cited

U.S. PATENT DOCUMENTS

| | | | |
|---|---|---|---|
| 4,539,197 A | 9/1985 | Asaka et al. | |
| 6,353,491 B1 * | 3/2002 | Tanaka et al. | 398/139 |
| 7,281,865 B2 * | 10/2007 | Baek et al. | 385/92 |
| 2003/0081897 A1 * | 5/2003 | Itoh et al. | 385/34 |
| 2005/0183460 A1 | 8/2005 | Takahara | |
| 2006/0140537 A1 | 6/2006 | Koishi | |

FOREIGN PATENT DOCUMENTS

JP    2004-279708 A    10/2004

* cited by examiner

*Primary Examiner*—Omar Rojas
(74) *Attorney, Agent, or Firm*—Brinks Hofer Gilson & Lione (57) ABSTRACT

An optical branching device comprises a first lens member comprising a transmitting plane surface, a transmitting convex surface having an approximate center of curvature in the transmitting plane surface, and a first optical fiber and a second optical fiber firmly affixed on the transmitting plane surface of the first lens member. The transmitting convex surface has a wavelength-selective mirror surface that transmits light of a first wavelength and reflects light of a second wavelength. The light of the second wavelength, which is one of the wavelengths of light emitted from the first optical fiber and is reflected and converged by the wavelength-selective mirror surface, enters into the second optical fiber.

10 Claims, 6 Drawing Sheets

OPTICAL BRANCHING DEVICE

This application claims priority under 35 U.S.C. § 119 to Japanese Patent Application No. JP2006-338014 filed Dec. 15, 2006, the entire content of which is hereby incorporated by reference.

BACKGROUND OF THE INVENTION

1. Technical Field

The present invention relates to an optical branching device in which an optical signal consisting of plural wavelengths transmitted through one optical fiber is divided, with respect to wavelength, so as to be transmitted into two optical fibers.

2. Background Art

In the field of optical transmission systems, various kinds of optical functional devices such as optical switches, optical isolators, optical circulators, optical attenuators, and wavelength-selective filters are required. These optical functional devices may be connected with an optical fiber directly or may be connected via an optical member called a "collimator lens". A structure in which a collimator lens is connected with an optical fiber is called an "optical fiber collimator". The optical fiber collimator has a function in which a light flux emitted from an end surface of an optical fiber is refracted into a parallel light flux by a collimator lens and is transmitted into an optical member, or in which a parallel light flux transmitted through an optical member is converged by a collimator lens and is transmitted into an optical fiber.

As a combined optical system (hereinafter called an "optical module") comprising the optical functional device and the optical fiber collimator, an optical branching device is known. The optical branching device has a function in which an optical signal consisting of plural wavelengths transmitted through an optical fiber is divided, with respect to wavelength, and is transmitted into two optical fibers. Therefore, a wavelength-selective filter for dividing an optical signal with respect to wavelength is used in the optical branching device. Optical modules such as optical branching devices are desirably manufactured at low cost. As a technique in which an optical module is provided at low cost, a technique disclosed in Japanese Unexamined Patent Application Publication No. 2004-279708 is known.

Figure 7A:
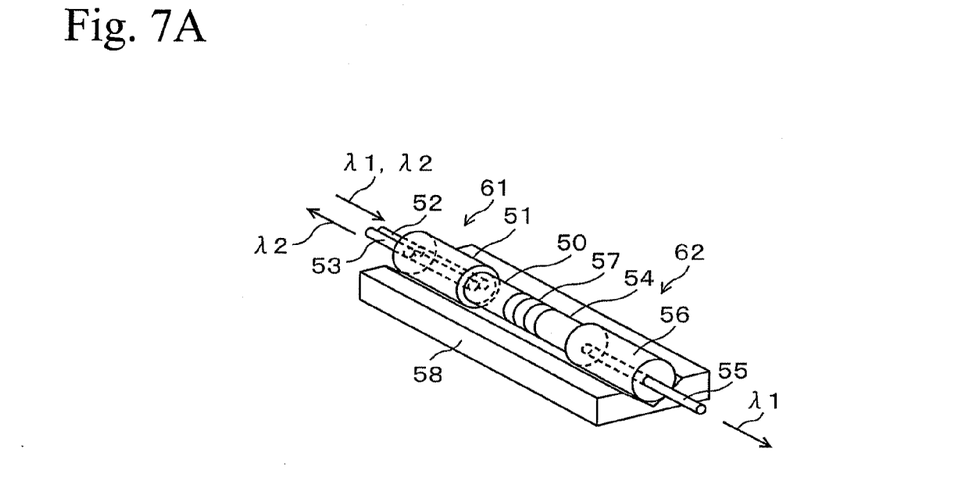
FIGS. 7A and 7B are schematic drawings showing a specific example of a conventional optical branching device.
Figure 7B:
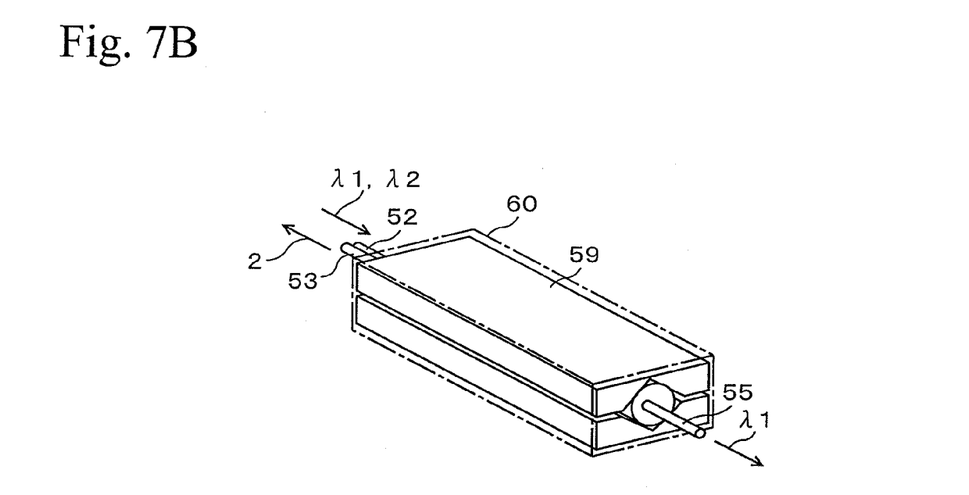

FIGS. 7A and 7B show an example of a conventional optical branching device. The optical branching device shown in FIG. 7A comprises a wavelength-selective filter 57 positioned on a V-shaped groove portion of a base plate 58. Both sides of the wavelength-selective filter 57 comprise an optical fiber collimator 61 and an optical fiber collimator 62, respectively.

The optical fiber collimator 61 comprises two optical fibers 52 and 53, a capillary 51 for holding the optical fibers, and a planoconvex lens 50. The capillary 51 comprises through holes at positions symmetric with respect to the optical axis of the planoconvex lens 50, and it holds the optical fibers 52 and 53 in the through holes. The end surfaces of the optical fibers 52 and 53 are bonded to a transmitting plane surface of the planoconvex lens 50.

The optical fiber collimator 62 comprises an optical fiber 55, a capillary 56, and a planoconvex lens 54. The capillary 56 comprises a thorough hole and holds the optical fiber 55 therein. The through hole of the capillary 56 and the through hole of the capillary 51 for holding the optical fiber 53 are symmetric with respect to the wavelength-selective filter 57. The end surface of the optical fiber 55 is bonded to a transmitting plane surface of the planoconvex lens 54.

As shown in FIG. 7B, the wavelength-selective filter 57 and the optical fiber collimators 61 and 62 are held together by using a pressing base plate 59 having the same shape as the base plate 58. Moreover, the entire structure is surrounded by a holding plate 60 made from a thin metal, and the clearance thereof is filled with a setting adhesive so as to form a hermetic structure. According to the structure, light which has a wavelength λ2 and which entered from the optical fiber 52 is reflected at the wavelength-selective filter 57 and enters into the optical fiber 53. On the other hand, light which has a wavelength λ1 and which entered from the optical fiber 52 is transmitted through the wavelength-selective filter 57, and the light is converged at the optical fiber 55 and is output from the optical fiber 55.

For example, techniques relating to the above technique are disclosed in Japanese Unexamined Application Publication Nos. 2005-234441 and 2006-209085. In the technique, only a collimator lens having a lower softening point than that of an optical fiber is softened, and an optical fiber is fusion bonded to the softened collimator lens.

In these conventional techniques, a wavelength-selective filter is required in addition to a collimator lens. The wavelength-selective filter functions as a reflecting mirror with respect to a certain wavelength, and a holding member (jig) is thereby required for accurately adjusting the position and the direction and holding the wavelength-selective filter. Moreover, a complicated operation for the adjustment is required.

When a wavelength-selective filter is required as additional parts and a holding member for adjusting the position and the direction of the wavelength-selective filter is also required, the cost of parts may be increased. Moreover, when adjustments of the position and the direction of a wavelength-selective filter are required for each product, manufacturing cost may be increased. Therefore, the optical branching device in the above conventional techniques would often be expensive.

SUMMARY OF THE INVENTION

An object of the present invention is to provide a technique to reduce the manufacturing costs of an optical branching device in which an optical signal, consisting of plural wavelengths transmitted through an optical fiber, is divided with respect to wavelength so as to be transmitted into two optical fibers.

The invention according to claim 1 provides an optical branching device comprising a first lens member and a first optical fiber and a second optical fiber. The first lens member is provided with a transmitting plane surface and a transmitting convex surface having an approximate center of curvature in the transmitting plane surface, and the transmitting convex surface is formed with a wavelength-selective mirror surface that transmits light of a first wavelength and reflects light of a second wavelength. The first optical fiber and the second optical fiber are firmly affixed on the transmitting plane surface of the first lens member. The light of the second wavelength, which is one of the wavelengths of light emitted from the first optical fiber and is reflected and converged by the wavelength-selective mirror surface, enters into the second optical fiber.

The invention according to claim 2 provides an optical branching device comprising a first lens member, a first optical fiber and a second optical fiber, a second lens member, and a third optical fiber. The first lens member is provided with a transmitting plane surface and a transmitting convex surface having an approximate center of curvature in the transmitting plane surface, and the transmitting convex surface is formed with a wavelength-selective mirror surface that transmits light of a first wavelength and reflects light of a second wavelength. The first and the second optical fibers are firmly affixed on the transmitting plane surface of the first lens member. The second lens member comprises a transmitting refractive surface arranged opposite to the first lens member so as to converge the light of the first wavelength, which is one of the wavelengths of light emitted from the first optical fiber and is transmitted through the wavelength-selective mirror surface, and it is also comprises a transmitting plane surface disposed at or in the vicinity of the focus of the light transmitted from the transmitting refractive surface. The third optical fiber is firmly affixed on the transmitting plane surface of the second lens member, and it is designed such that the light of the first wavelength converged by the transmitting refractive surface enters thereinto. The light of the second wavelength, which is one of the wavelengths of light emitted from the first optical fiber and is reflected and converged by the wavelength-selective mirror surface, enters into the second optical fiber.

In the invention according to claim 1 or 2, a wavelength-selective mirror surface is formed by coating on a transmitting convex surface that is a side of the first lens member and is not firmly affixed with the optical fiber. Therefore, there is no need to prepare a wavelength-selective mirror as additional part. Moreover, the wavelength-selective mirror surface can be formed by coating on the surface of the transmitting convex surface of the first lens member, whereby the position adjustment and an adjustment of axial direction of reflected light in the wavelength-selective mirror are not required in a manufacturing process. Therefore, a holding member (jig) for the adjustment is not required. Accordingly, costs of parts and manufacturing can be reduced compared to the costs resulting from the conventional techniques.

In the invention according to claim 3 according to claim 1 or 2, positions for affixing the first and the second optical fibers on the transmitting plane surface are approximately symmetric with respect to an optical axis of the first lens member. The position approximately symmetric to the optical axis of the first lens member is the position that is approximately axially symmetric to that optical axis. In addition, the position approximately symmetric to the optical axis has a dimensional accuracy which is not more than a maximum wavelength, and which is preferably not more than approximately 50% of the maximum wavelength. It should be noted that the dimensional accuracy is also applied to positions which are approximately aligned. According to the invention according to claim 3, light of a second wavelength reflected at a wavelength-selective mirror surface can be efficiently transmitted into the second optical fiber.

In the invention according to claim 4 according to one of claims 1 to 3, end surfaces of the first and the second optical fibers are inclined surfaces, and each inclined surface faces an optical axis of the first lens member. The invention according to claim 4 employs a phenomenon in which a primary light of a light flux emitted from an optical fiber that has an inclined structure at an end is refracted in an oblique direction with respect to the optical axis of the optical fiber. Therefore, a light flux is effectively emitted from the first optical fiber to the wavelength-selective mirror surface, and a reflected light flux of the light flux reflected at the wavelength-selective mirror is effectively converged at the second optical fiber. Moreover, forming the end of the optical fiber into an inclined surface prevents a reflected light of an optical signal, which is generated at the end surface of the optical fiber, from intersecting the optical axis of the optical fiber, and undesirable effects caused by the reflected light can be reduced. It should be noted that a primary light represents a central axis of a light flux. In other words, a primary light represents an axis that shows the direction of the center of a light flux that spreads to a certain extent.

In the invention according to claim 5 according to claim 4, the center of the inclined surface of the first optical fiber emits a light flux having a primary light, the primary light is inclined with respect to the optical axis of the first lens member at angle $\theta 1$, the light flux is reflected at the wavelength-selective mirror surface at angle $\theta 2$ with respect to the optical axis of the first lens member, and the two angles $\theta 1$ and $\theta 2$ are approximately the same.

According to the above embodiment, the direction of the inclined surface and the inclined angle of the end portion of the optical fiber that is firmly fixed to the first lens member are adjusted, whereby light of a second wavelength is reflected at a wavelength-selective mirror surface, and the reflected light is efficiently transmitted into the second optical fiber when the light enters from the first optical fiber to the first lens member. It should be noted that the above angles are approximately the same are defined as angles which are different from each other by not more than 30%, and it is preferable that they be different from each other by not more than 15%.

In this case, when an angle between a normal vector A of the inclined surface and the optical axis of the optical fiber is expressed by "$\theta$", the direction of the inclined surface is defined as the direction of $\sin \theta$ component of the normal vector A (direction of sine component). The inclined angle of the inclined surface is defined as a value of the above angle "$\theta$".

In the invention according to claim 6 according to claim 5, the inclined surfaces of the end surfaces of the first and the second optical fibers are adjusted so that the two angles $\theta 1$ and $\theta 2$ are approximately the same.

In the invention according to claim 7 according to claim 4, the optical axes of the transmitting convex surface and the first lens member intersect around an extended line of a primary light of a light flux emitted from the center of the inclined surface of the first optical fiber, and the optical axes of the transmitting convex surface and the first lens member intersect around an extended line of a primary light of a light flux emitted from the center of the inclined surface of the second optical fiber. In this case, the same effects as those of the invention according to claim 5 can be obtained.

In the invention according to claim 8 according to claim 2, each inclined surface of the end surface of the first and the second optical fibers faces the optical axis of the first lens member, and the end surface of the third optical fiber is an inclined surface which faces the optical axis of the second lens member. In this case, light of a first wavelength transmitted through the wavelength-selective mirror surface of the first lens member can be efficiently transmitted into the third optical fiber.

In the invention according to claim 9 according to one of claims 1 to 8, the wavelength-selective mirror surface is formed by a multilayer thin film provided on the surface of the transmitting convex surface. In this case, a wavelength-selective mirror surface is provided by deposition on the surface of the transmitting convex surface, whereby the wavelength-selective mirror surface can be precisely formed. The precision of the wavelength-selective mirror surface depends on the precision of the transmitting convex surface provided to the first lens member, and the manufacturing cost can thereby be reduced compared to that in a case in which a wavelength-selective mirror is required as an additional part.

According to the present invention, there is no need to prepare a wavelength-selective filter separately. Moreover, adjustments of the position and an incline of the wavelength-selective filter are not required, whereby a member for adjusting can be removed, and a process for adjusting can be eliminated. Therefore, costs of parts and manufacturing can be reduced.

PREFERRED EMBODIMENTS OF THE INVENTION

1. First Embodiment

Figure 1A:
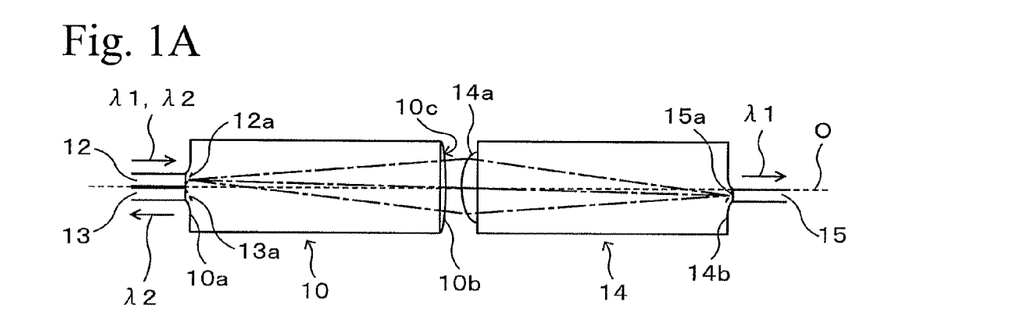
FIG. 1A is a schematic drawing showing an example of a main structure of an optical branching device using the present invention.
Figure 1B:
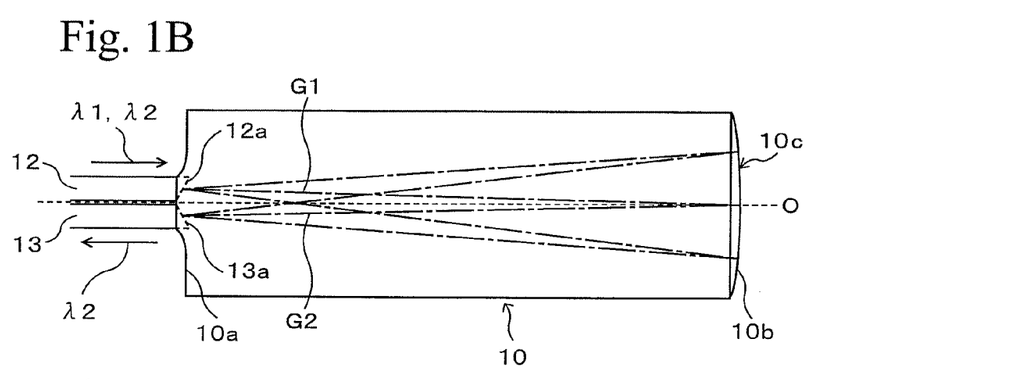
FIGS. 1B and 1C are schematic drawings showing a primary light of a light flux having a wavelength $\lambda 2$.
Figure 1C:
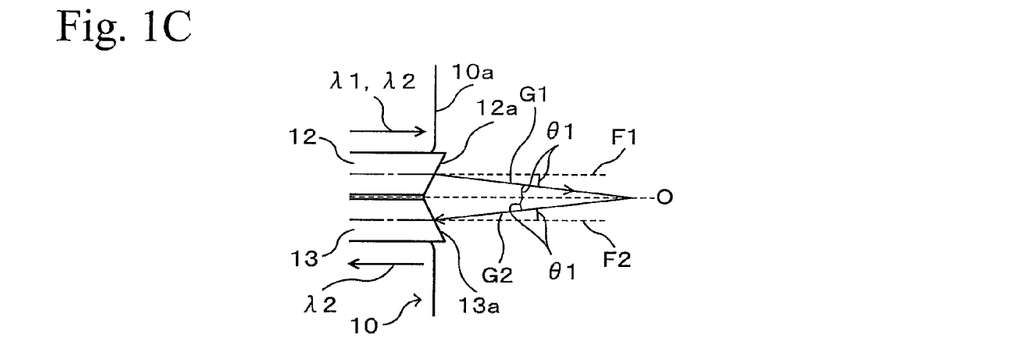
Figure 1D:
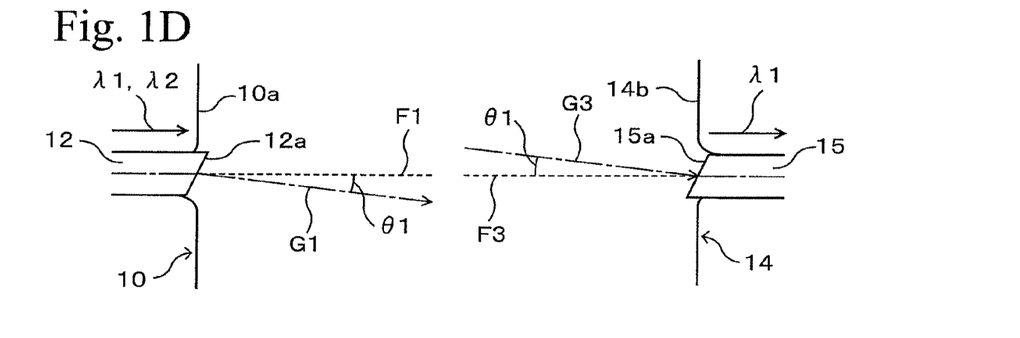
FIG. 1D is a schematic drawing showing a primary light of a light flux having a wavelength $\lambda 1$.

FIGS. 1A to 1D are schematic drawings showing an example of an optical branching device using the present invention. FIG. 1A is a schematic drawing showing an outline of an optical brunching device, FIGS. 1B and 1C are schematic drawings showing a primary light of a light flux having a wavelength $\lambda 2$, and FIG. 1D is a schematic drawing showing a primary light of a light flux having a wavelength $\lambda 1$.

The optical branching device shown in FIG. 1A mainly comprises a planoconvex lens 10 (an example of a first lens member), an optical fiber 12 (an example of a first optical fiber), an optical fiber 13 (an example of a second optical fiber), a planoconvex lens 14 (an example of a second lens member), and an optical fiber 15 (an example of a third optical fiber).

Structure of First Lens Member Side

A structure of a first lens member side will be described. A planoconvex lens 10 is made from a multicomponent glass of borosilicate type (refractive index: approximately 1.57) in which a thermal softening point is approximately 700 degrees centigrade. The planoconvex lens 10 comprises a transmitting plane surface 10a through which an optical signal that was transmitted into the optical fibers 12 and 13 is transmitted, and a transmitting convex surface 10c, which is a portion of a spherical surface having an approximate center of curvature in the center of the transmitting plane surface 10a. Moreover, the transmitting convex surface 10c is formed with a wavelength-selective mirror surface 10b.

The wavelength-selective mirror surface 10b is formed by coating a wavelength-selective reflecting film on the transmitting convex surface 10c which has a shape of a spherical surface and has an approximate center of curvature in the center of the transmitting plane surface 10a (an intersection point of the transmitting plane surface 10a and an optical axis O), and it transmits light of a first wavelength and reflects light of a second wavelength. As a wavelength-selective reflecting film, a dielectric multilayer film may be employed, for example. A wavelength-selective reflecting film using an ordinary dielectric multilayer film comprises a multilayer film formed by alternately laminating and depositing two substances having different refractive indexes. That is, if a wavelength of light that is to be reflected is defined as $\lambda$, the multilayer film is formed by periodically laminating films having a thickness of $\lambda/4$ as, for example, "H L H L H . . . L H". In this case, the mark "H" expresses a film having a high refractive index, and the mark "L" expresses a film having a low refractive index. For example, $TiO_2$ (dioxide titanium, refractive index n=2.3) as a film having a high refractive index, and $SiO_2$ (quartz, refractive index n=1.45) as a film having a low refractive index may be used. In this embodiment, the wavelength-selective mirror 10b is set to transmit light of a wavelength $\lambda 1$ and to reflect light of a wavelength $\lambda 2$.

The optical fibers 12 and 13 mainly made from a quartz glass (refractive index: approximately 1.44) in which a thermal softening point is approximately 1700 degrees centigrade, for example. The end surfaces of the optical fibers 12 and 13 are firmly fixed to the transmitting plane surface 10a of the planoconvex lens 10. Fusion bonding the optical fibers 12 and 13 by utilizing the difference of the thermal softening point thereof is employed as a method for affixing firmly. The method for fusion bonding will be described in detail hereinafter.

As shown in FIG. 1B, the positions for firmly fixing the first optical fiber 12 and the second optical fiber 13 to the transmitting plane surface 10a are symmetric to the optical axis O of the planoconvex lens 10. Moreover, the first optical fiber 12 and the second optical fiber 13 are vertically firmly fixed to the transmitting plane surface 10a. That is, the optical axes of the first optical fiber 12 and the second optical fiber 13 are parallel to the optical axis O of the planoconvex lens 10.

An end surface of the optical fiber 12 forms an inclined surface 12a, and an end surface of the optical fiber 13 forms an inclined surface 13a. The inclined surface is formed by cutting the optical fiber crosswise. The inclined surfaces 12a and 13a face the optical axis O of the planoconvex lens 10. That is, the inclined surfaces 12a and 13a face each other having the optical axis O therebetween. The inclined angles of the inclined surfaces 12a and 13a are the same.

A direction of a primary light of a light flux emitted from an optical fiber having an inclined surface at an end will be described hereinafter. The left side of FIG. 1B shows an example of an optical fiber 12 firmly fixed to a planoconvex lens 10. In this case, the end of the optical fiber 12 forms an inclined surface 12a, and the refractive index of the planoconvex lens 10 is larger than that of the optical fiber 12, whereby a primary light G1 of a light flux emitted from the inclined surface 12a is refracted to the direction in which the inclined surface 12a faces. The direction in which the inclined surface 12a faces is defined as the direction of a cosine vector of a normal vector of the inclined surface 12a with respect to an optical axis F1 of the optical fiber 12.

In the embodiment, as shown in FIG. 1B, the inclined surface 12a of the optical fiber 12 and the inclined surface 13a of the optical fiber 13 are set to face the optical axis O of the planoconvex lens 10, and the positions for firmly fixing the first optical fiber 12 and the second optical fiber 13 are symmetric to the optical axis O of the planoconvex lens 10. The wavelength-selective mirror surface 10b is a spherical surface having an approximate center of curvature in the center of the transmitting plane surface 10a (an intersection point of the transmitting plane surface 10a and the optical axis O). Therefore, as shown in FIG. 1B, a light flux having a component (a component having a wavelength λ2) that is reflected at the wavelength-selective mirror 10b, which is one of a light flux emitted from the first optical fiber 12, is converged at the center of the inclined surface 13a of the second optical fiber 13. In this case, the inclined surface 13a has an inclined angle and a direction that are symmetric to the optical axis O with respect to the inclined surface 12a, whereby the light flux converged at the inclined surface 13a is efficiently transmitted into the optical fiber 13. That is, an optical signal which has a wavelength λ2 and is transmitted through the first optical fiber 12 is transmitted into the second optical fiber 13.

FIG. 1C schematically shows a relationship of the direction of a primary light of a light flux emitted from the optical fiber 12 and the direction of a primary light of a light flux emitted from the optical fiber 13, if there is a light flux emitted from the optical fiber 13. As shown in FIG. 1C, a primary light G1 of a light flux is emitted from the optical fiber 12 at an angle θ1 with respect to the optical axis F of the optical fiber 12 and the optical axis O of the planoconvex lens 10. Similarly, a primary light G2 of a light flux is emitted from the optical fiber 13 at an angle θ1 with respect to an optical axis F2 of the optical fiber 13 and the optical axis O of the planoconvex lens 10. In addition, as shown in FIG. 1B, an intersection point of a reflecting surface of the wavelength-selective mirror 10b and the optical axis O is arranged approximately on the extended line of the primary light G1, and an intersection point of the reflecting surface of the wavelength-selective mirror 10b and the optical axis O is arranged approximately on the extended line of the primary light G2.

Structure of Second Lens Member Side

A structure of a second lens member side will be described. A planoconvex lens 14 is primarily made from a multicomponent glass of a borosilicate type in which a softening point is approximately 700 degrees centigrade, which is the same as the case of the planoconvex lens 10. The planoconvex lens 14 comprises an aspheric transmitting convex surface 14a (an example of a transmitting refractive surface) and a transmitting plane surface 14b. The transmitting convex surface 14a of the planoconvex lens 14 is arranged by facing closely to the planoconvex lens 10, and the optical axes of the plane convex lenses 10 and 14 are approximately aligned. The optical axis of the planoconvex lens 14 is also expressed by a mark "O", which is the same as the mark of the optical axis of the planoconvex lens 10 in the figures.

An optical fiber 15 is primarily made form a quartz glass having a softening point of approximately 1700 degrees centigrade, which is the same as the case of the optical fibers 12 and 13. An end surface of the optical fiber 15 is firmly affixed to the transmitting plane surface 14b of the planoconvex lens 14. In addition, the end surface of the optical fiber 15 forms an inclined surface 15a. The inclined surface 15a faces the optical axis O. The inclined angle of the inclined surface 15a is approximately the same as those of the inclined surfaces 12a and 13a. The optical fiber 15 is firmly affixed to the transmitting plane surface 14b at approximately the extended line of the optical axis of the optical fiber 13. As shown in FIG. 1D, if there is a light flux emitted from the optical fiber 15, a primary light G3 thereof is emitted at an angle θ1 with respect to an optical axis F3 of the optical fiber 15.

According to this structure, as shown in FIG. 1A, a light flux having a wavelength λ1 emitted from the first optical fiber 12 is transmitted through the wavelength-selective mirror 10b, and it is refracted at the transmitting convex surface 14a and is converged at the center of the inclined surface 15a. That is, an optical signal having a wavelength λ1 emitted from the first optical fiber 12 is transmitted into the third optical fiber 15.

Process for Manufacturing First Embodiment

An example of a process for manufacturing an optical branching device as illustrated in FIGS. 1A to 1D will be described. Firstly, an example of a method for firmly affixing optical fibers 12 and 13 to a transmitting plane surface 10a of a planoconvex lens 10 will be described.

A pair of discharging electrodes (not shown in the figure) is arranged at upper and lower positions of the direction perpendicular to the transmitting plane surface 10a of the planoconvex lens 10, which has a lower softening point than those of the optical fibers 12 and 13. The optical fibers 12 and 13 are arranged close to (or in slight contact with) the transmitting plane surface 10a, and inclined surfaces thereof are adjusted to face a predetermined direction. The adjustment of the direction of the inclined surface is performed by looking through a microscope and turning the optical fiber with a jig (not shown in the figure). Then, the optical fibers 12 and 13 are adjusted so as to be placed at positions symmetric to the optical axis O.

The position adjustment is performed by a method comprising arranging the end surface, which is an inclined surface of each optical fiber, close to (or in slight contact with) the transmitting plane surface 10a of the planoconvex lens 10, and then transmitting an optical signal having a wavelength λ2 into the optical fiber 12 and using a reflected light of the optical signal transmitted into the optical fiber 13. That is, the optical fibers 12 and 13 are adjusted and positioned on the transmitting plane surface 10a so that the optical signal having a wavelength λ2 detected through the optical fiber 13 is brought to maximum signal strength. Simultaneously, the optical fibers 12 and 13 may be turned so as to adjust the direction of the inclined surfaces.

After the adjustment is performed, the electrodes (not shown in the figure) are supplied with a high voltage so as to generate an arc discharge, and an area near the position in which the end surface of each optical fiber is arranged close to (or in contact with) the transmitting plane surface 10a is heated briefly. In this case, the discharge condition is adjusted so that the heating temperature is not less than the softening point of the planoconvex lens 10 and is lower than the softening point of the optical fibers 12 and 13. The transmitting plane surface 10a is swelled and fused by the heating, and it is raised on the side of the optical fibers 12 and 13 by capillary action. Thus, the optical fibers 12 and 13 are fusion bonded to the planoconvex lens 10, and they are firmly fixed.

According to the above method, a structure as shown in FIG. 1B is obtained. Next, an example of a process for obtaining a structure as shown in FIG. 1A will be described based on the structure as shown in FIG. 1B. A transmitting refractive surface 14a of a planoconvex lens 14 is arranged close to the transmitting convex surface 10c of the planoconvex lens 10 shown in FIG. 1B. In this case, the planoconvex lenses 10 and 14 are arranged on an affixing member (not shown in the figure). A pair of discharging electrodes (not shown in the figure) is arranged on the side of the transmitting plane surface 14b of the planoconvex lens 14, and an end surface, which is an inclined surface of a third optical fiber 15, is arranged proximity to (or in slight contact with) the transmitting plane surface 14b. In this case, the inclined surface of the end surface of the optical fiber 15 is adjusted to face the optical axis O.

Then, an optical signal having a wavelength λ1 is input into the optical fiber 12, and the mutual position of the planoconvex lenses 10 and 14 and the relative position of the optical fiber 15 with respect to the transmitting plane surface 14b are adjusted so that the optical signal having a wavelength λ1 output from the optical fiber 15 is brought to maximum signal strength. Thus, the adjustment of the optical axis is performed.

After the optical axis is adjusted, the mutual position of the planoconvex lenses 10 and 14 is fixed, and an arc discharge is generated by the discharging electrodes (not shown in the figure) so that the optical fiber 15 is fusion bonded to the transmitting plane surface 14b. Thus, a structure shown in FIG. 1A is obtained.

Specific Design Example

Figure 2A:
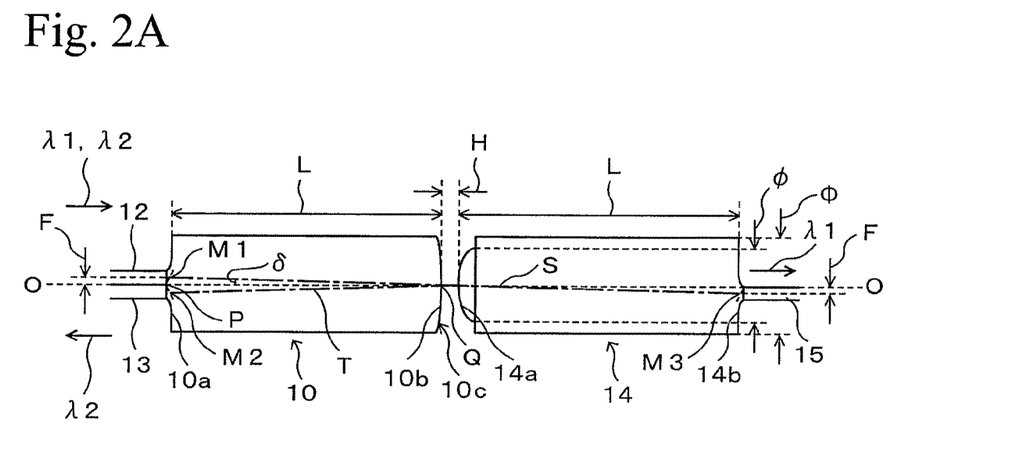
FIG. 2A is a schematic drawing showing a specific design example of an optical branching device using the present invention.
Figure 2B:
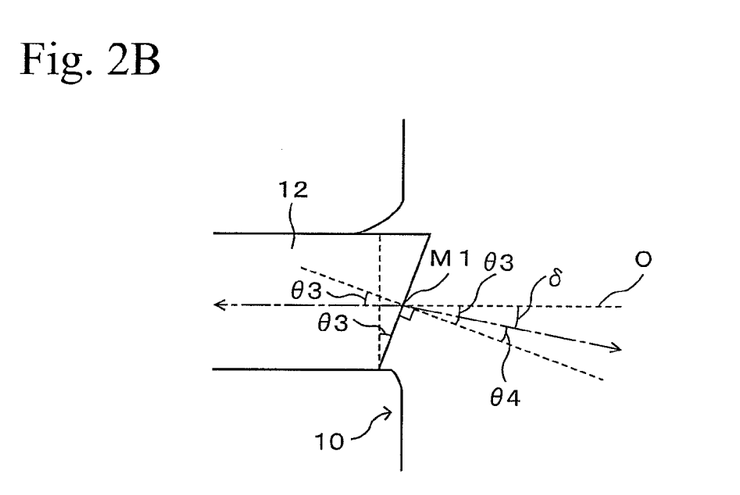
FIG. 2B is a schematic drawing for calculating an incident angle and a refractive angle at a boundary between an optical fiber 12 and a planoconvex lens 10.

A specific design example of the optical branching device shown in FIGS. 1A to 1D will be described hereinafter. In this case, FIGS. 2A and 2B are schematic drawings for explaining the meanings of various design parameters.

1. Preconditions

Preconditions of the design example will be described. Optical fibers 12, 13, and 15 shown in FIGS. 2A and 2B are single-mode fibers, they are 9 to 10 μm in core diameter and are 125 μm in cladded diameter, and they are made from $SiO_2$ (quartz glass) having a refractive index of $n_1$=1.444018. In addition, the end surfaces of the optical fibers are inclined surfaces, and the inclined angles θ3 (hereinafter called the "cleave angle") are the same.

The planoconvex lenses 10 and 14 are made from a multi-component glass having a diffractive index of $n_2$=1.565072. The planoconvex lenses 10 and 14 are 1.0 mm in outer diameter of the lens (effective diameter of lens=0.7 mm), and they are designed to have the same length L of lens. The wavelength-selective mirror surface 10b is formed by forming a coating of a dielectric multilayer film. Moreover, the dielectric multilayer film is adjusted so as to have a design condition in which it transmits light that has a wavelength λ1=1.55 μm and reflects light that has a wavelength λ2=1.3 μm. These are preconditions. Then, a specific design example based on the above conditions will be described.

2. Arrangement of Optical Fiber

As shown in FIG. 2A, the optical fibers 12 and 13 are contacted with an optical axis O at the longitudinal sides thereof. In the optical fiber 15, the longitudinal side is positioned at the optical axis O, and the optical axis thereof is aligned on the optical axis line of the optical fiber 13. In this case, a distance F between the optical axis O and the central axis of each optical fiber is a fiber radius, and it is 62.5 μm.

3. Convex shape of First Lens Member

As shown in FIG. 2A, an intersection point P of the transmitting plane surface 10a and the optical axis O of the planoconvex lens 10 is coincided with a center of curvature of a spherical shape of a transmitting convex surface 10c (wavelength-selective mirror surface 10b). That is, the wavelength-selective mirror surface 10b has a spherical surface having the point P as a center. In this case, a radius of curvature of the wavelength-selective mirror surface 10b is the same as the length L of the lens of the planoconvex lens 10. The length L of the lens is set to be sufficiently (at least approximately 20 times) longer than the distance 2F between the central axes of the optical fibers 12 and 13. Accordingly, effects of incident angle of light in a range of wavelengths that is reflected at the wavelength-selective mirror surface 10b can be decreased.

4. Length of Lens of First Lens Member

The length L of lens is defined by an inclined angle δ of a primary light, that is, the cleave angle θ3. Hereinafter, an example of a method for calculating a length of the lens will be described by using a relationship of the cleave angle and the inclined angle of a primary light and a relationship of the inclined angle of the primary light and the length of lens.

(1) Relationship of Cleave Angle and Inclined Angle of Primary Light

Figure 4A:
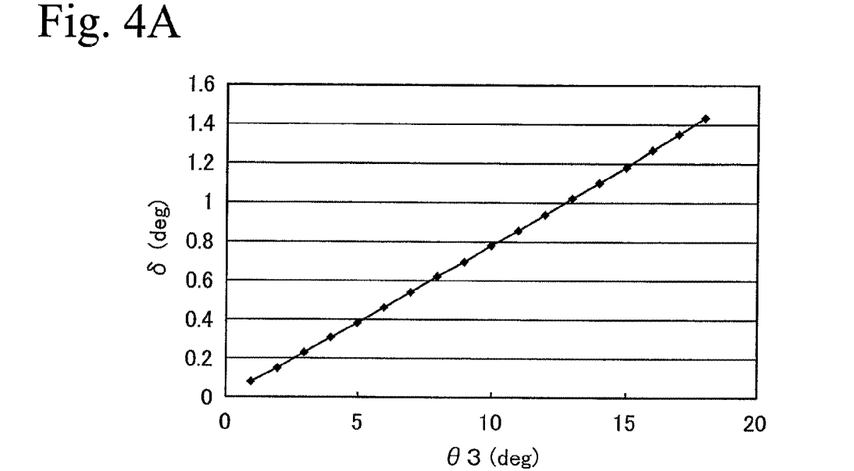
FIG. 4A is a graph showing the relationship of inclined angle of a primary light and cleave angle.

As shown in FIG. 2B, the cleave angle θ3 is defined as an angle formed by a normal vector of an inclined surface and an optical axis O. According to Snell's law, the relationship of the cleave angle θ3 and a refractive angle θ4 is expressed as $n_1 \sin\theta3 = n_2 \sin\theta4$. It should be noted that $n_1$ is a refractive index of the optical fiber 12, and $n_2$ is a refractive index of the planoconvex lens 10. The inclined angle δ of a primary light of a light flux emitted from an inclined surface is expressed by δ=θ3−θ4, and therefore, the relationship of the inclined angle δ of a primary light and the cleave angle θ3 is expressed as the following first numerical formula by using the two formulas. Based on the first numerical formula, a graph in which a longitudinal axis expresses as an inclined angle δ of a primary light and a horizontal axis expresses a cleave angle θ3 is shown in FIG. 4A.

$$\delta = \theta3 - \arcsin\frac{n_1 \sin\theta3}{n_2} \qquad \text{First Numerical Formula}$$

(2) Relationship of Inclined Angle of Primary Light and Length of Lens

Figure 4B:
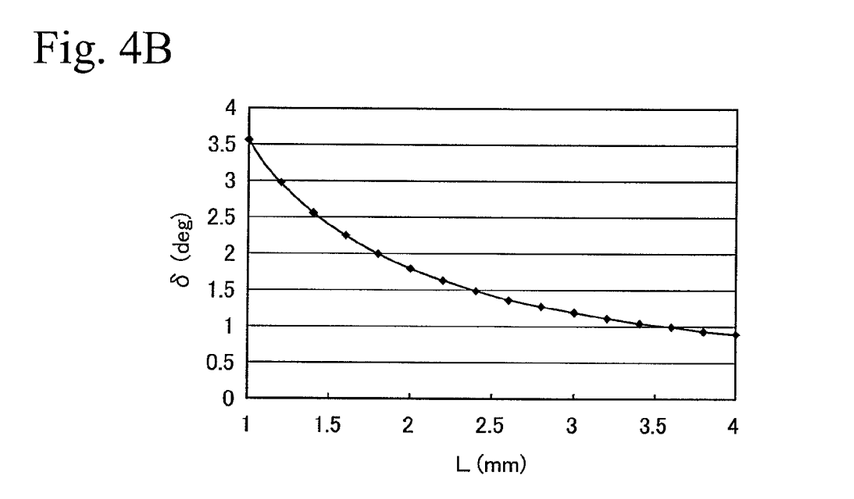
FIG. 4B is a graph showing the relationship of inclined angle of a primary light and length of a lens.

In FIG. 2A, the inclined angle δ of a primary light is designed to have the same angle as an incident angle with respect to a top Q of the convex surface of the wavelength-selective mirror 10b. That is, the value of δ is designed so that a primary light of a light flux emitted from the optical fiber 12 goes through the top Q. In this case, according to FIG. 2A, tan δ=F/L, and the relationship of the inclined angle δ of a primary light and the length L of the lens is expressed as the following second numerical formula. Based on the second numerical formula, a graph in which a longitudinal axis expresses an inclined angle δ of a primary light, and a horizontal axis expresses a length L of lens, is shown in FIG. 4B. It should be noted that F expresses a fiber radius F, and F=62.5 μm=0.0625 mm.

$$\delta = \arctan\frac{F}{L} \qquad \text{Second Numerical Formula}$$

According to FIG. 4A, the direction of a primary light of a light flux emitted from the optical fiber 12 into the planoconvex lens 10 can be selected by setting the inclined angle of an inclined surface (cleave angle). Moreover, according to FIG. 4B, a length L of the planoconvex lens 10 required for the above δ can be selected.

In the embodiment, the value of δ is set to be 1.2 degrees so that the influence of incident angle of light in a range of wavelengths that is reflected at the wavelength-selective mirror surface 10b can be decreased, and so that the value of L will be as small as possible. Two optical fibers being 62.5 μm in fiber radius are arranged in contact with each other, whereby θ3 is selected to be approximately 15 degrees by FIG. 4A so that a primary light of a light flux emitted from the optical fiber 12 reaches the point Q. In this case, according to FIG. 4B, L is approximately 3 mm.

5. Distance Between First and Second Lens Members and Convex Shape of Second Lens Member In FIG. 2A, a distance H between lenses and a convex shape of a transmitting refractive surface 14a are designed so that a light flux transmitted through the wavelength-selective mirror 10b is refracted at a transmitting refractive surface 14a and is converged to a center M3 of the end surface of an optical fiber 15. The convex shape of the transmitting refractive surface 14a is the shape of an aspheric surface, and it has a curved surface formed by rotating a curved line, which is obtained by the following third numerical formula, around an optical axis.

$$Z = \frac{cr^2}{1 + \sqrt{1 - (1+K)c^2r^2}} + Ar^4 + Br^6 + Cr^8 + Dr^{10}$$

Third Numerical Formula

Figure 5:
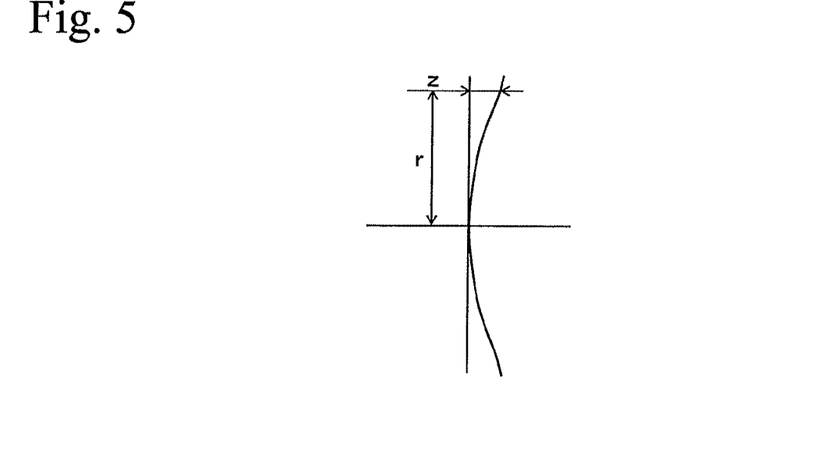
FIG. 5 is a schematic drawing explaining parameters used for calculating a shape of an aspheric surface.

FIG. 5 is a schematic drawing for explaining parameters in the third numerical formula. As shown in FIG. 5, it should be noted that "r" is a height from the optical axis, and "Z" is a distance between a point of the aspheric surface and a tangent plane of the top of the aspheric surface when the height from the optical axis is "r". "c" is a curvature (inverse of curvature radius) of the top of the aspheric surface, "K" is a cone constant, and "A", "B", "C", and "D" are aspheric surface coefficients. In the design example, a coupling efficiency was preferable when the distance H between lenses was approximately 0.3 mm, and the parameters had values shown in the following Table 1.

TABLE 1

| Data of aspheric surface | |
|---|---|
| r | 0.677538 |
| K | 1.104463 |
| A | −1.27639 |
| B | 6.698208 |
| C | −71.0129 |
| D | 141.1942 |

Figure 3A:
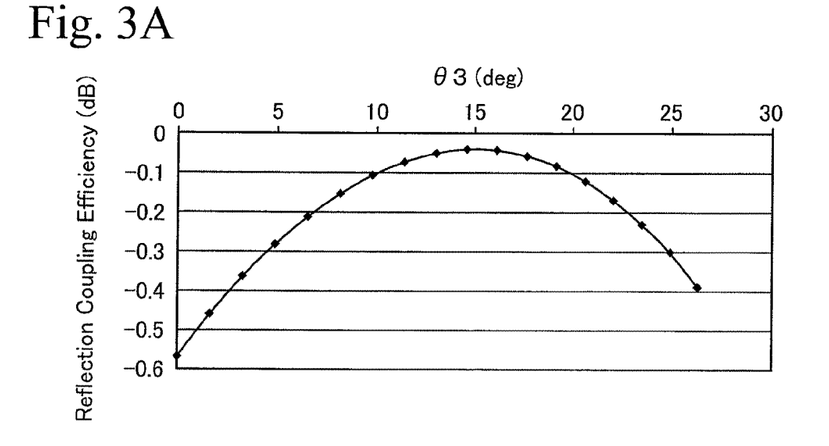
FIG. 3A is a graph showing the relationship of cleave angle (an inclined angle of an inclined surface) and reflection coupling efficiency.

A coupling efficiency (coupling loss) due to the shape of the aspheric surface will be described hereinafter. FIG. 3A is a graph showing a coupling efficiency of reflected light accompanied by a change of the cleave angle θ3. The coupling efficiency is preferable when the cleave angle θ3 is approximately 15 degrees. In this case, the inclined angle of a primary light is approximately 1.2 degrees.

Figure 3B:
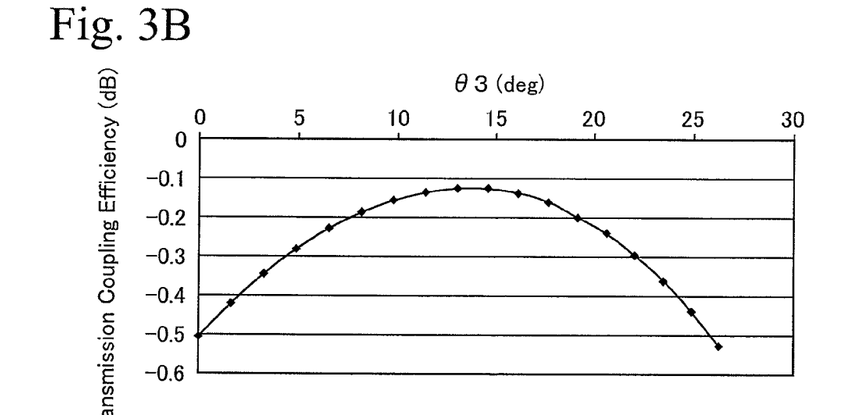
FIG. 3B is a graph showing the relationship of cleave angle and transmission coupling efficiency.
Figure 3C:
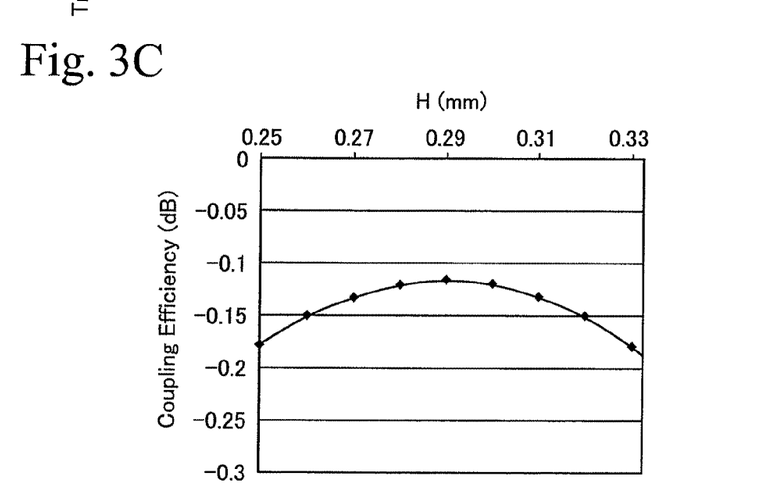
FIG. 3C is a graph showing the relationship of distance between lenses and coupling efficiency.

FIG. 3B is a graph showing a coupling efficiency of transmitted light accompanied by a change of the cleave angle θ3. The coupling efficiency is preferable when θ3 is approximately 14 degrees. In this case, the inclined angle of a primary light in the planoconvex lens 14 is approximately 1.06 degrees. FIG. 3C is a graph showing a coupling efficiency accompanied by a change of the distance H between lenses. In this case, the coupling efficiency is preferable when the distance H between lenses is approximately 0.29 mm.

Specific Embodiment of Optical Branching Device

Figure 6A:
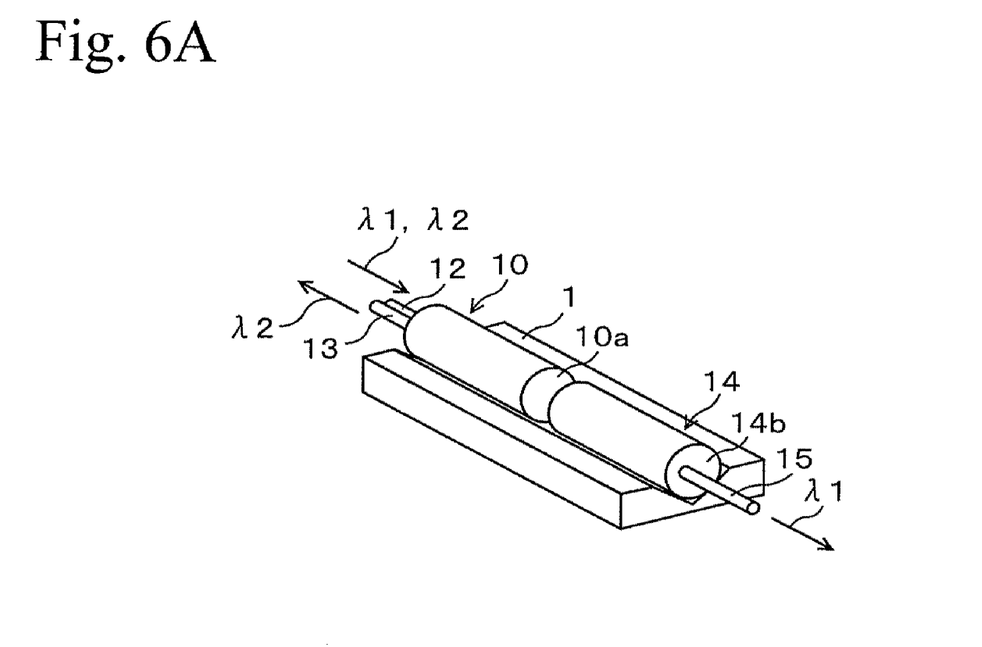
FIGS. 6A and 6B are schematic drawings showing a specific example of an optical branching device using the present invention.

A specific embodiment of an optical branching device of the embodiment will be described hereinafter. FIG. 6A shows a condition in which a planoconvex lens 10 with firmly fixed optical fibers 12 and 13 and a planoconvex lens 14 with a firmly fixed optical fiber 15 are arranged on a V-shaped groove of a base plate. The base plate 1 is approximately 6.3 mm in length and approximately 3 mm in width.

The optical fibers 12 and 13 are firmly fixed on the planoconvex lens 10. The method for firmly fixing the optical fibers 12 and 13 follows the above-mentioned method. The planoconvex lens 10 and the planoconvex lens 14 in which the optical fiber 15 is not affixed are put on the base plate 1, and position adjustment is performed by the above-mentioned method so that the relative position of the planoconvex lenses 10 and 14 is set, and so that the positional relation of the optical fiber 15 to the planoconvex lens 14 is set. Then, the relative position of the planoconvex lenses 10 and 14 is fixed by a setting adhesive, and the optical fiber 15 is fusion bonded to the planoconvex lens 14 by discharging. The planoconvex lenses 10 and 14 are held by using a pressing base plate 2 that has the same shape as the base plate 1, and the entire structure is surrounded by a thin holding sheet 3 made from metal and is affixed by filling clearances with a setting adhesive. Thus, an optical branching device shown in FIG. 6B is obtained.

In this case, the base plate 1 and the pressing base plate 2 are not limited to the shape having a V-shaped groove, and they may have a shape of intersect section that can fix the planoconvex lenses 10 and 14.

Figure 6B:
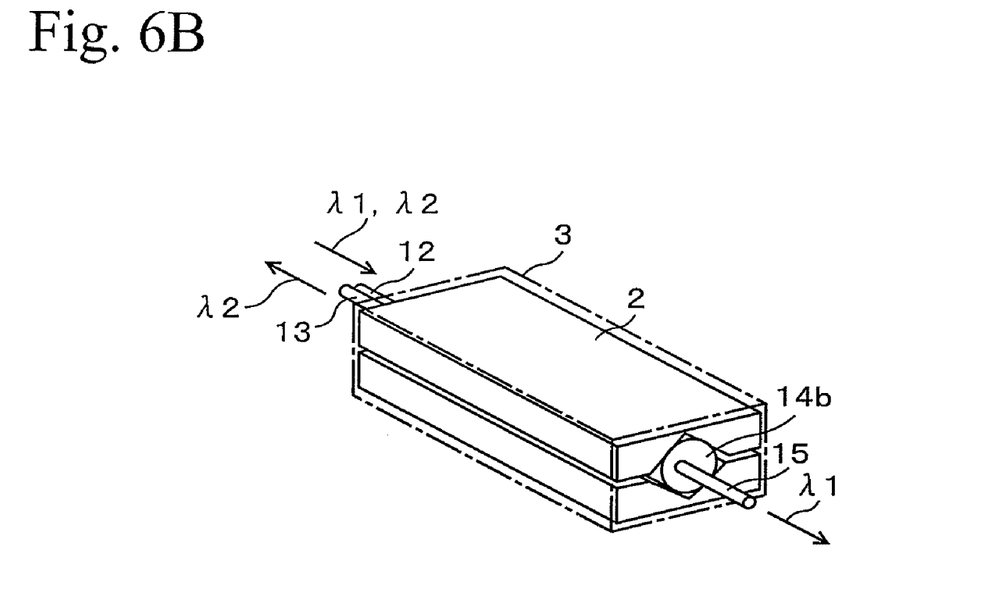

In the optical branching device shown in FIG. 6B, when an optical signal having wavelengths λ1 and λ2 enters into the optical fiber 12, the optical signal having a wavelength λ1 is output from the optical fiber 15, and the optical signal having a wavelength λ2 is output from the optical fiber 13. That is, the optical signal having two kinds of wavelengths transmitted in the optical fiber 12 is divided according to the difference of wavelength, and it is output from the optical fiber 15 or 13.

In a manufacturing process of the optical branching device shown in FIGS. 6A and 6B, a wavelength-selective mirror is not used as a discrete member, whereby a part cost can be reduced. Moreover, the position adjustment and the angle adjustment of the wavelength-selective mirror are not required, whereby a process for adjusting can be eliminated, and a member for adjusting can be omitted. This is also an advantage in reducing the manufacturing cost.

Additional Embodiment

As an embodiment employing the inventive concept according to claim 1 and 2, besides utilizing an inclined condition of a light which is emitted from an inclined surface structure portion of an end surface of an optical fiber, a method in which at least one of each optical fiber is obliquely affixed to a transmitting plane surface of each lens member may be mentioned. In this case, an operation for aligning the optical axes thereof is difficult compared to the case of the above-mentioned embodiments.

The present invention can be used for an optical branching device in which an optical signal consisting of plural wavelengths transmitted through an optical fiber is divided with respect to wavelength so as to be transmitted into two optical fibers.

What is claimed is:

1. An optical branching device comprising:

a first lens member comprising a transmitting plane surface as an incidence plane and a transmitting convex surface as an output plane, the transmitting convex surface having an approximate center of curvature in the transmitting plane surface and having a wavelength-selective mirror surface which transmits light of a first wavelength and reflects light of a second wavelength; and a first optical fiber and a second optical fiber firmly affixed on the transmitting plane surface of the first lens member, wherein the approximate center of curvature of the transmitting convex surface is an intersection point of the transmitting plane surface and an optical axis of the first lens member, wherein positions for affixing the first optical fiber and the second optical fiber on the transmitting plane surface are approximately symmetric with respect to the optical axis of the first lens member, whereby the light of the second wavelength, which is one of the wavelengths of light emitted from the first optical fiber and is reflected and converged by the wavelength-selective mirror surface, enters into the second optical fiber.

2. An optical branching device comprising:

a first lens member comprising a transmitting plane surface as an incidence plane and a transmitting convex surface as an output plane, the transmitting convex surface having an approximate center of curvature in the transmitting plane surface and having a wavelength-selective mirror surface which transmits light of a first wavelength and reflects light of a second wavelength;

a first optical fiber and a second optical fiber firmly affixed on the transmitting plane surface of the first lens member;

a second lens member comprising a transmitting refractive surface arranged opposite to the first lens member so as to converge the light of the first wavelength, which is one of the wavelengths of light emitted from the first optical fiber and is transmitted through the wavelength-selective mirror surface, and a transmitting plane surface disposed at or in the vicinity of the focus of the light transmitted from the transmitting refractive surface; and a third optical fiber firmly affixed on the transmitting plane surface of the second lens member and designed such that the light of the first wavelength converged by the transmitting refractive surface enters thereinto, wherein the approximate center of curvature of the transmitting convex surface is an intersection point of the transmitting plane surface and an optical axis of the first lens member, wherein positions for affixing the first optical fiber and the second optical fiber on the transmitting plane surface are approximately symmetric with respect to the optical axis of the first lens member, whereby the light of the second wavelength, which is one of the wavelengths of light emitted from the first optical fiber and is reflected and converged by the wavelength-selective mirror surface, enters into the second optical fiber.

3. The optical branching device according to claim 1, wherein end surfaces of the first and the second optical fibers are inclined surfaces, and each inclined surface faces the optical axis of the first lens member.

4. The optical branching device according to claim 3, wherein the center of the inclined surface of the first optical fiber emits a light flux having a primary light, the primary light is inclined with respect to the optical axis of the first lens member at a first angle, the light flux is reflected at the wavelength-selective mirror surface at a second angle with respect to the optical axis of the first lens member, and the first angle and second angle are approximately the same.

5. The optical branching device according to claim 4, wherein the inclined surfaces of the end surfaces of the first and the second optical fibers are adjusted so that the first angle and second angle are approximately the same.

6. The optical branching device according to claim 3, wherein the optical axes of the transmitting convex surface and the first lens member intersect around an extended line of a primary light of a light flux emitted from the center of the inclined surface of the first optical fiber, and the optical axes of the transmitting convex surface and the first lens member intersect around an extended line of a primary light of a light flux emitted from the center of the inclined surface of the second optical fiber.

7. The optical branching device according to claim 2, wherein an end surface of the first optical fiber and end surface of the second optical fiber are inclined surfaces, each inclined surface of the end surface of the first and the second optical fibers faces the optical axis of the first lens member, and the end surface of the third optical fiber is an inclined surface which faces the optical axis of the second lens member.

8. The optical branching device according to claim 1, wherein the wavelength-selective mirror surface is formed by a multilayer thin film provided on the surface of the transmitting convex surface.

9. The optical branching device according to claim 2, wherein end surfaces of the first and the second optical fibers are inclined surfaces, and each inclined surface faces the optical axis of the first lens member.

10. The optical branching device according to claim 2, wherein the wavelength-selective mirror surface is formed by a multilayer thin film provided on the surface of the transmitting convex surface.

* * * * *